United States Patent
Noessing

(10) Patent No.: US 9,510,093 B2
(45) Date of Patent: Nov. 29, 2016

(54) DEVICE AND METHOD FOR HUM SIGNAL COMPENSATION IN ANALOG TELEPHONY SIGNALS

(71) Applicant: Lantiq Deutschland GmbH, Neubiberg (DE)

(72) Inventor: Gerhard Noessing, Villach (AT)

(73) Assignee: Lantiq Deutschland GmbH, Neubiberg (DE)

( * ) Notice: Subject to any disclaimer, the term of this patent is extended or adjusted under 35 U.S.C. 154(b) by 0 days.

(21) Appl. No.: 14/645,588

(22) Filed: Mar. 12, 2015

(65) Prior Publication Data

US 2015/0264477 A1    Sep. 17, 2015

(30) Foreign Application Priority Data

Mar. 12, 2014  (DE) .......................... 10 2014 103 313

(51) Int. Cl.
| | |
|---|---|
| *G10K 11/16* | (2006.01) |
| *H04R 3/00* | (2006.01) |
| *G10K 11/178* | (2006.01) |
| *H04B 3/30* | (2006.01) |
| *H04B 15/00* | (2006.01) |
| *G10L 21/0208* | (2013.01) |

(52) U.S. Cl.
CPC ........... *H04R 3/002* (2013.01); *G10K 11/1784* (2013.01); *H04B 3/30* (2013.01); *H04B 15/005* (2013.01); *G10L 2021/02085* (2013.01)

(58) Field of Classification Search
None
See application file for complete search history.

(56) References Cited

U.S. PATENT DOCUMENTS

| | | | |
|---|---|---|---|
| 4,433,213 | A | 2/1984 | Albers et al. |
| 6,594,364 | B2 | 7/2003 | Linder |
| 7,656,933 | B2 | 2/2010 | Klinke et al. |
| 2002/0123308 | A1 | 9/2002 | Feltstrom |
| 2005/0096002 | A1 | 5/2005 | Klinke et al. |
| 2010/0161324 | A1* | 6/2010 | Tanaka ................. G10K 11/178 704/226 |
| 2012/0116753 | A1 | 5/2012 | Strandh et al. |

FOREIGN PATENT DOCUMENTS

| | | |
|---|---|---|
| DE | 2527933 B1 | 9/1976 |
| JP | 01-318433 | 12/1989 |
| JP | 2011-72725 A | 4/2011 |
| JP | 2012-160832 A | 8/2012 |

OTHER PUBLICATIONS

Ilchmann, Bernd: "Störungen in Schaltnetzteilen effektiv beseitigen. Netzfilter im SO-8", published in 'elektronik industrie' May 2008.
Vaughan, Peter: "Designing low leakage current power supplies", published in 'EE Times Asia' Nov. 16, 2004.
Schmidt-Walter, Heinz: "Funkentstörung von Schaltnetzteilen", in: Schmidt-Walter, Heinz: "Schaltnetzteile", probably lecture notes, date unknown.

* cited by examiner

*Primary Examiner* — Muhammad N Edun
(74) *Attorney, Agent, or Firm* — Eschweiler & Associates, LLC

(57) ABSTRACT

A device comprises an interface for transferring an analog telephony signal. Further, the device comprises a compensation circuit which detects a hum signal in the analog telephony signal, generates a compensation signal opposite in phase with the hum signal, and combines the compensation signal with the analog telephony signal.

12 Claims, 5 Drawing Sheets

DEVICE AND METHOD FOR HUM SIGNAL COMPENSATION IN ANALOG TELEPHONY SIGNALS

CROSS-REFERENCE TO RELATED APPLICATIONS

Figure 1:
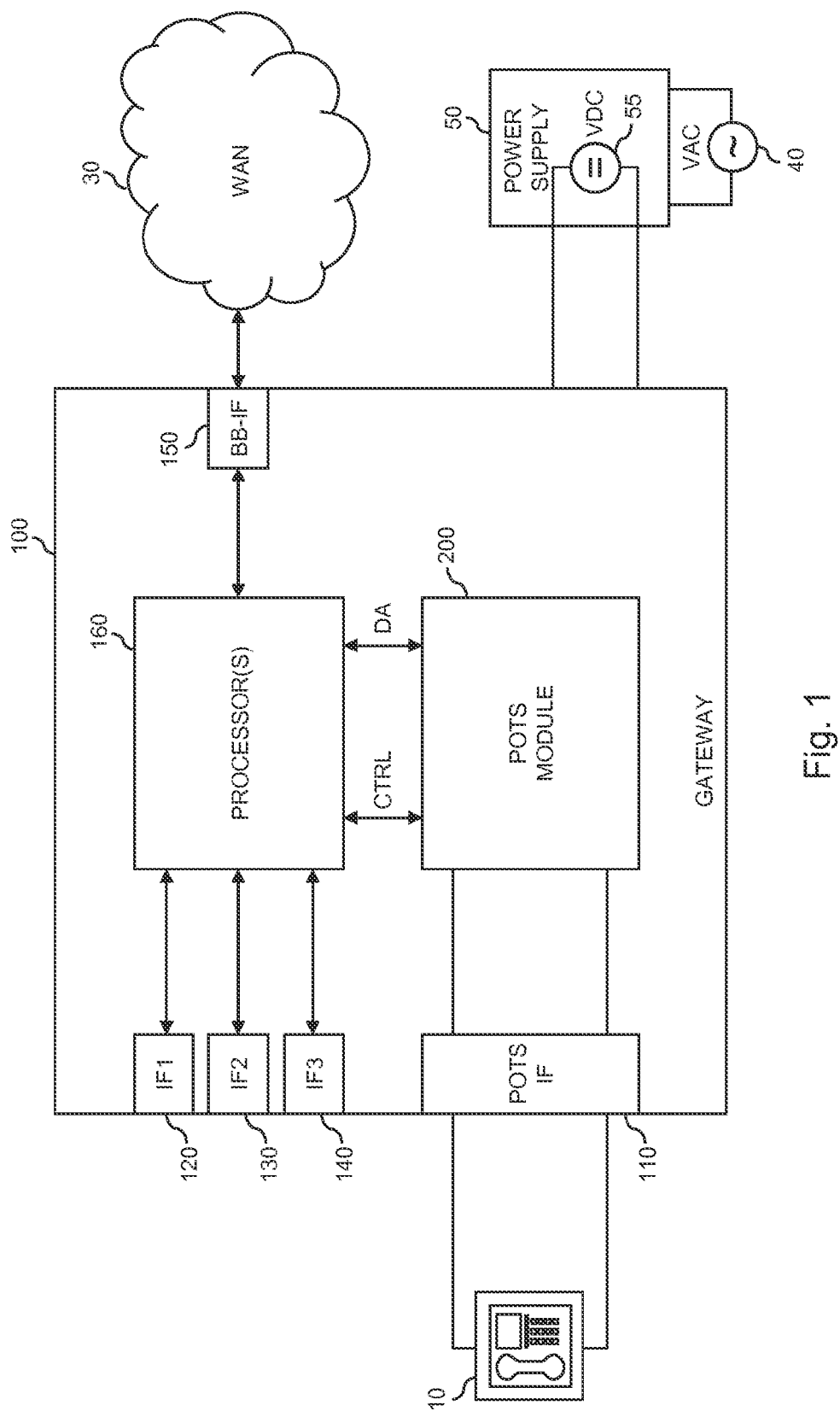

This application claims priority benefit of German Patent Application DE 10 2014 103 313.2 filed on Mar. 12, 2014. The entire contents of the German Patent Application are incorporated herein by reference.

BACKGROUND

The present invention relates to devices and to methods for hum signal compensation in analog telephony signals.

In digital communication networks, it is known to provide an analog telephony service, also referred to as "Plain Old Telephony System" (POTS), through a network termination device on the subscriber side. This network termination device provides a POTS interface through which a conventional analog telephone apparatus can be connected.

Such subscriber side network termination device is typically supplied by a power supply which generates a DC voltage from power mains with the country specific line voltage. The country specific line voltage may for example be an AC voltage of 220 V with 50 Hz or an AC voltage of 120 V with 50 Hz. The DC voltage provided by the power supply can for example be 12 V.

There is a trend to use more and more switched power supplies. Switched power supplies in particular have the advantage that they can be realized with a compact design. In switched power supplies, an included transformer is not operated at the frequency of the line voltage, but rather primarily clocked at a higher frequency, this higher frequency typically being in the range of 100 kHz to 300 kHz.

The high voltage on the primary side of the transformer of the switched power supply as well as the high frequency switching in the power supply may, however, cause high frequency voltage spikes of high amplitude on the primary side. Through a winding capacitance between the primary and secondary side of the transformer, these voltage spikes may couple to the secondary side and there cause common-mode interference. Through capacitances against ground, a current associated with such common-mode interference may also couple back to the primary side. Due to asymmetric discharge capacitances, this may result in a measurable differential disturbance in the generated DC voltage. According to the standard EN55022, such disturbances are not allowed to exceed a certain threshold.

One possibility to ensure that the disturbances remain within the limits provided by the standard is the utilization of a so-called Y-capacitor. By means of this Y-capacitor, high frequency signal contributions between the primary and secondary side can be short-circuited, so that the high frequency current does no longer flow back through ground, but rather mainly through the Y-capacitor.

However, the Y-capacitor establishes a coupling between the DC voltage generated by the power supply and the line voltage. Since the DC voltage output of the power supply is typically allowed to be touched by persons, the Y-capacitor must comply with a certain safety class, referred to as class Y. Further, the size of the Y-capacitor is limited, because in the case of touching by a person a certain current may not be exceeded. Typically, this results in a size limitation at a maximum capacitance value of 2-3 nF.

The utilization of the Y-capacitor and in particular the existing limitations with respect to the Y-capacitor concerning safety class and size typically result in a mains hum with the frequency of the line voltage and typically also associated harmonics being present in the DC voltage generated by the power supply. In the network termination device, this may in turn result in a differential signal developing at the POTS interface, which may be perceptible for a user of the connected analog telephone apparatus as audible hum.

Accordingly, there is a need for solutions which allow for disturbance-free processing of an analog telephony signal.

According to an embodiment, a device is provided which for example may be used in a subscriber side network termination device. The device comprises an interface for transferring an analog telephony signal. Further, the device comprises a compensation circuit. The compensation circuit is configured to detect a hum signal in the analog telephony signal. Further, the compensation circuit is configured to generate a compensation signal which is opposite in phase with the hum signal.

According to a further embodiment, a method is provided, which for example may be implemented by one or more components in a subscriber side network termination device. According to the method, a hum signal is detected in an analog telephony signal. Further, a compensation signal is generated which is opposite in phase with the hum signal. The compensation signal is combined with the analog telephony signal.

Further details of these embodiments and further embodiments will be explained in the following with reference to the accompanying drawings.

FIG. 1 schematically illustrates an application scenario for processing of analog telephony signals according to an embodiment of the invention.

Figure 2:
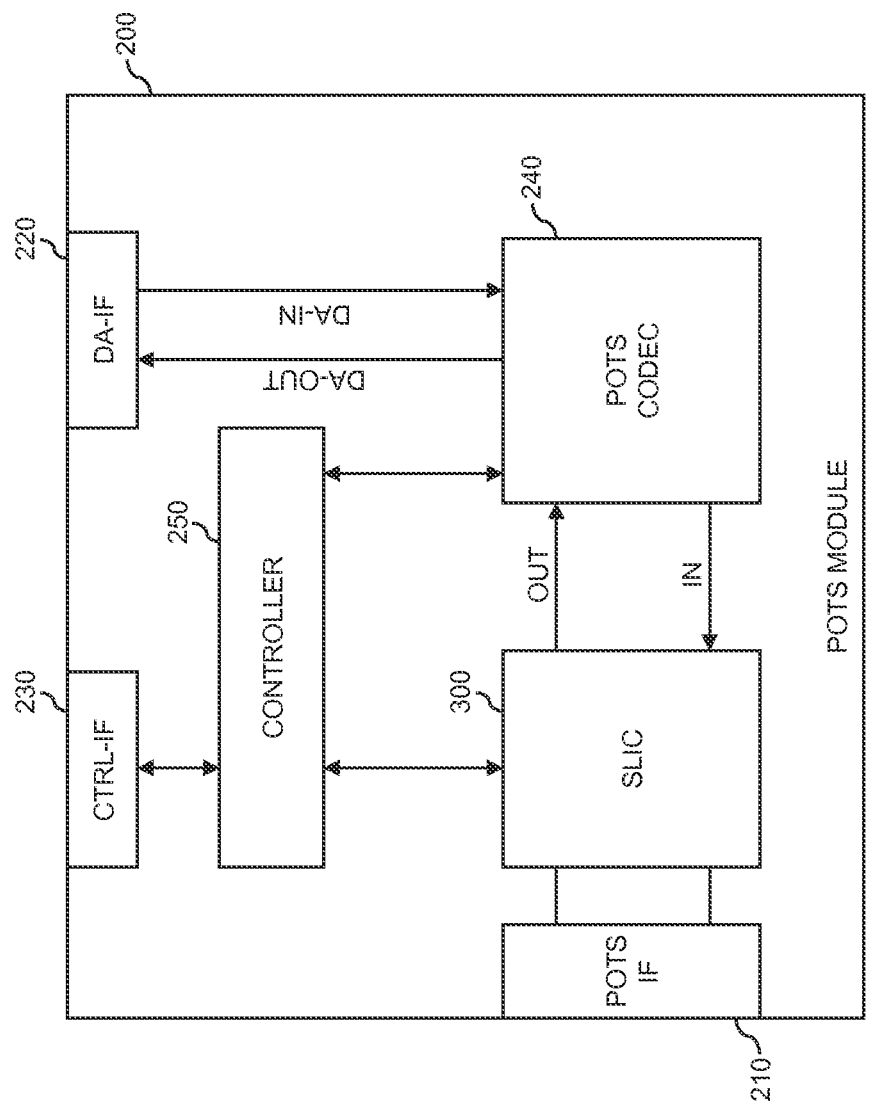

FIG. 2 schematically illustrates structures of a POTS module according to an embodiment of the invention.

Figure 3:
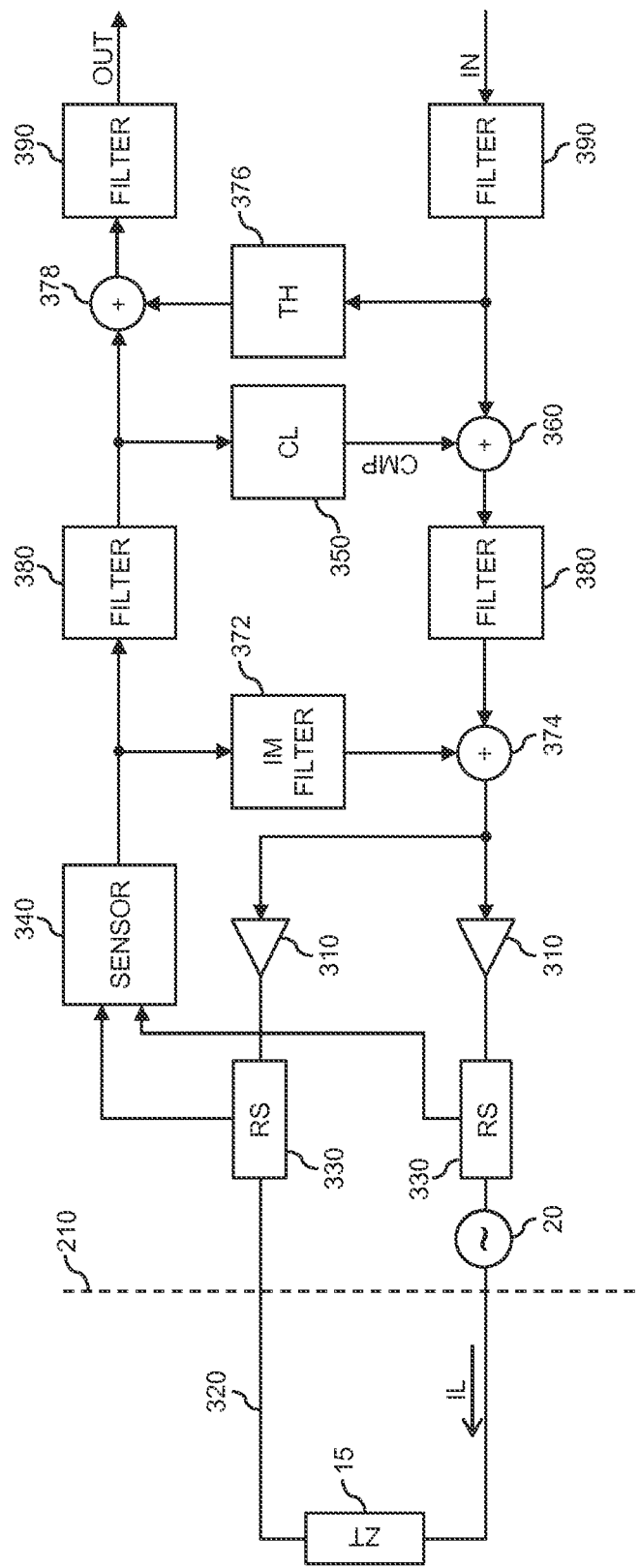

FIG. 3 schematically illustrates a subscriber line interface circuit according to an embodiment of the invention.

Figure 4:
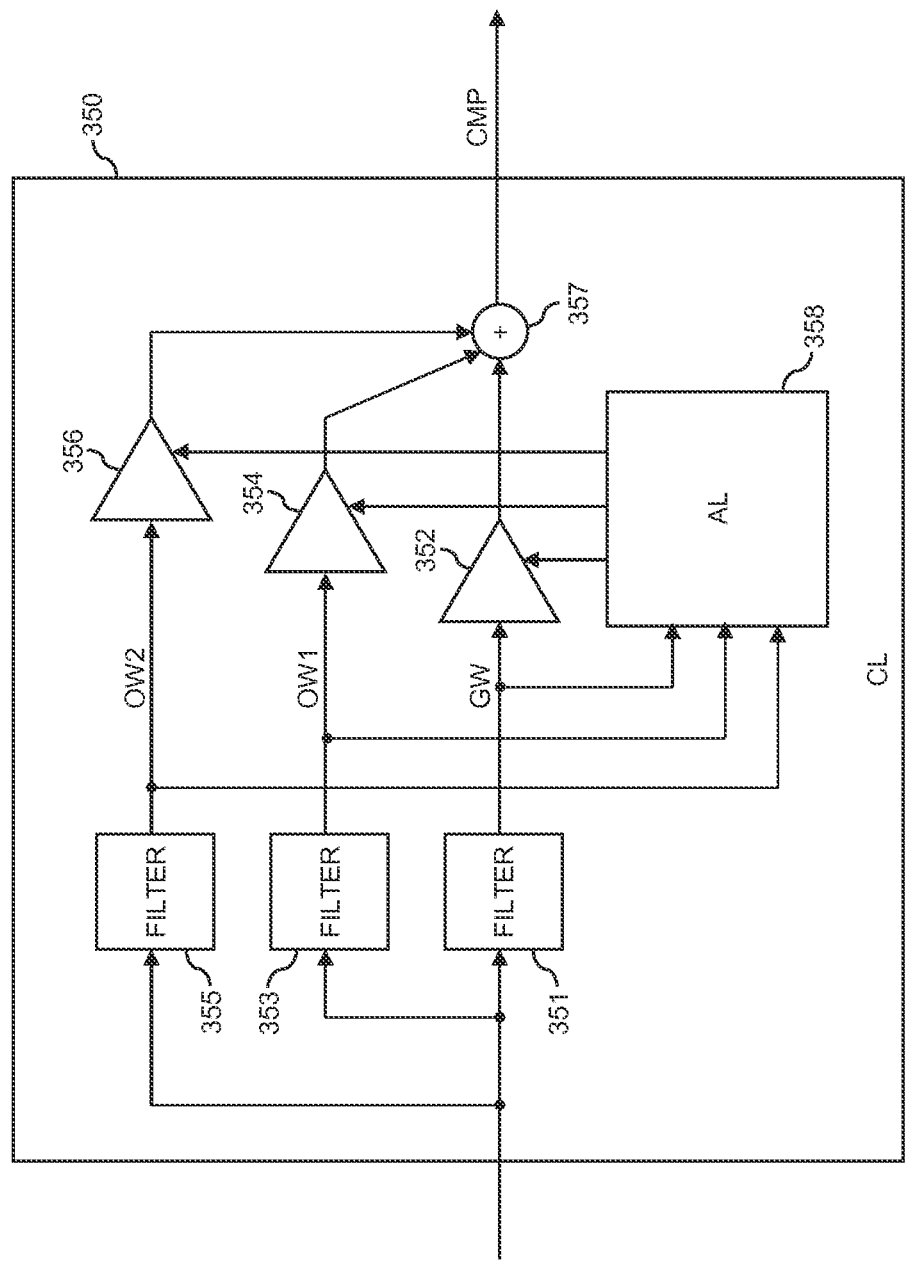

FIG. 4 schematically illustrates structures of a compensation circuit according to an embodiment of the invention.

Figure 5:
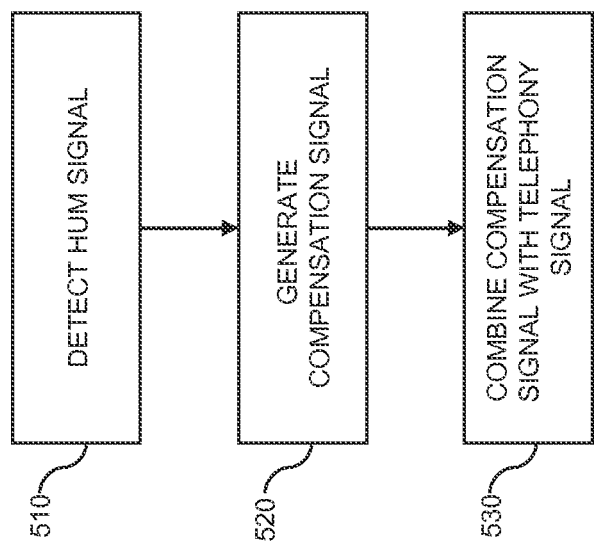

FIG. 5 shows a flow chart for illustrating a method according to an embodiment of the invention.

In the following, embodiments of the present invention will be further explained with reference to the accompanying drawings. Here, it is to be understood that the illustrated embodiments merely have the purpose of illustrating implementation options of the invention and are not to be understood as limitation thereof. In particular, features of different embodiments may be combined with each other. Further, description of an embodiment with a plurality of features is not to be construed in the sense that all these features are necessary for carrying out the invention. For example, other embodiments may have less features and/or alternative features.

Embodiments as illustrated in the following relate to a device for processing analog telephony signals, which has the form of a POTS module for a subscriber side network termination device, and to a method for processing an analog telephony signal, by which functions of such device may be implemented. The subscriber side network termination device may for example be a gateway, a router or an integrated access device (IAD).

In the illustrated embodiments, the device comprises an interface for transferring an analog telephony signal, in particular a POTS interface. Further, the device includes a compensation circuit. The compensation circuit is configured to detect a hum signal in the analog telephony signal, to generate a compensation signal which is opposite in phase with the hum signal, generated in the device from power mains, and to combine the compensation signal with the analog telephony signal. In this way, audible disturbances associated with the hum signal may be suppressed to a significant extent. The hum signal may in particular be a mains hum introduced by a power supply of the device. Depending on a line voltage utilized on the input side, the hum signal typically has a fundamental wave with a frequency of 50 Hz or 60 Hz. Further, the hum signal may have harmonic waves at multiples of the frequency of the fundamental wave.

In some implementations, the compensation circuit may be configured to detect an amplitude of the hum signal and adapt an amplitude of the compensation signal depending on the detected amplitude. In this way, the compensation signal may be adapted with the aim of a maximum suppression of the hum signal in the analog telephony signal.

In some implementations, the compensation circuit may be configured to detect a fundamental wave of the hum signal and at least one harmonic wave of the hum signal, and to generate the compensation signal with signal components which are opposite in phase with the fundamental wave and the at least one harmonic wave. In this case, the compensation circuit may also be configured to detect in the hum signal an amplitude of the fundamental wave and respectively an amplitude of the at least one harmonic wave. Furthermore, the compensation circuit may also be configured to adapt in the compensation signal an amplitude of the signal component in opposite phase with the fundamental wave and respectively an amplitude of the signal component in opposite phase with the at least one harmonic wave.

In the above-mentioned implementations, it becomes possible to actively suppress the disturbance caused by the hum signal by detecting the hum signal and combining the analog telephony signal with the compensation signal which is in opposite phase with the hum signal. In particular, in this way it becomes possible that the hum signal is suppressed at least to such an extent that there is no audible disturbance for a user of a telephone apparatus connected to the interface for analog telephony signals. Further, an audible disturbance caused by the hum signal may also be avoided for a remote participant of a telephone call. Altogether, quality of voice transmission may thus be improved.

FIG. 1 schematically illustrates an application scenario in which the above-mentioned concepts may be utilized. The application scenario of FIG. 1 assumes that an analog telephony service, in particular a POTS service, is provided via a digital communication network 30. For this purpose, a network termination device is provided on the subscriber side, which in the scenario of FIG. 1 is implemented as a gateway 100. The gateway 100 has an interface 110 with the purpose of transferring analog telephony signals, in particular POTS signals. The interface 110 is therefore in the following also referred to as POTS interface (POTS-IF).

Furthermore, the gateway 100 is provided with a POTS module 200, which processes the POTS signals. In particular, the POTS module 200 accomplishes a conversion between the analog POTS signals, which are transferred through the POTS interface 110, and digital audio signals (DA). The digital audio signals DA may for example be transferred in the form of PCM signals (PCM: pulse-code-modulation).

In the illustrated implementation, the digital audio signals DA are communicated with one or more processors 160 of the gateway 100. By this/these processor(s) 160, for example typical communication protocols for a gateway may be provided, e.g., the Internet Protocol (IP) and one or more protocols for VoIP communication (VoIP: Voice over Internet Protocol).

Further, in the illustrated implementation the gateway 100 has further interfaces (IF1, IF2 and IF3) 120, 130, 140, which may be utilized for connecting additional end devices. The interfaces 120, 130, 140 may for example be a WLAN interface (WLAN: Wireless Local Area Network), an Ethernet interface, and/or a USB interface (USB: Universal Serial Bus). Communication protocols required for the interfaces 120, 130, 140 may also be implemented by the processor(s) 160.

Further, the gateway 100 has a digital broadband interface (BB-IF) 150. By means of the digital broadband interface 150, the gateway 100 may communicate via a digital communication path with the digital communication network 30. In the illustrated implementation, the digital communication network 30 is a Wide Area Network (WAN). The digital communication network 30 may for example be IP based and support voice telephony by VoIP. The digital communication path, which couples the digital broadband interface 150 to the digital communication network 30, may for example be a copper line pair which is utilized in connection with a DSL communication technology (DSL: Digital Subscriber Line). Alternatively, the digital communication path may also be realized by coaxial cable or optical wave guide.

Through the POTS interface 110, an analog telephone apparatus 10 may be connected to the gateway 100. In this way, telephone calls may be established with the analog telephone apparatus 10 via the digital communication network 30.

As further illustrated in FIG. 1, the processor(s) 160 may also implement control functionalities with respect to the POTS module 200. For this purpose, control signals CTRL may be communicated between the processor(s) 160 and the POTS module 200.

FIG. 1 further shows a power supply 50 which has the purpose of supplying the gateway 100 with energy. The power supply 50 is connected to a line voltage source 40, which provides a line voltage VAC. Depending on the country, the line voltage VAC may for example be an AC voltage of 220 V with 50 Hz or an AC voltage of 120 V with 60 Hz. The power supply 50 accomplishes a conversion of the line voltage VAC to a DC voltage VDC, which in FIG. 1 is schematically illustrated by a DC voltage source 55. The DC voltage VDC provided by the power supply 50 may for example be 12 V.

However, the DC voltage VDC generated by the power supply 50 may also include a mains hum which includes a fundamental wave corresponding to the frequency of the line voltage VAC. Further, the mains hum may also include harmonic waves, which correspond to multiples of the frequency of the line voltage VAC. If for example the frequency of the line voltage VAC is 50 Hz, the frequency of the fundamental wave of the mains hum is also 50 Hz. A first harmonic wave of the mains hum may then be at 100 Hz, and a second harmonic wave of the mains hum may then be at 150 Hz. A significant mains hum may in particular be expected when the power supply 50 is implemented as a switching power supply clocked at high frequency.

The mains hum present in the DC voltage VDC provided by the power supply 50 may result in a hum signal in the analog telephony signals transferred through the POTS interface 110, which in turn may be audible for a user of the telephone apparatus 10 as a disturbing noise. By implementing the POTS module 200 with a device for processing analog telephony signals as described above, the hum signal may however be suppressed to an extent which avoids disturbances audible to the user of the telephone apparatus 10.

FIG. 2 further illustrates an implementation of the POTS module 200. In the illustrated implementation, the POTS module 200 includes a POTS interface 210, which has the purpose of transferring the POTS signals. In the application scenario of FIG. 1, the POTS interface 210 of the POTS module 200 would be coupled with the POTS interface 110 of the gateway 100.

Further, the POTS module 200 is provided with a digital audio interface (DA-IF) 220, which has the purpose of transferring the digital audio signals. As illustrated, these digital audio signals may be outgoing digital audio signals (DA-OUT) and incoming digital audio signals (DA-IN). Further, the POTS module 200 may be provided with a control interface 230 (CTRL-IF), through which the above-mentioned control signals (CTRL) may be communicated.

In the illustrated implementation, the POTS module 200 is provided with a POTS codec 240, which accomplishes a conversion between the digital audio signals DA-OUT, DA-IN and the analog POTS signals. In particular, in the illustrated implementation, the POTS codec 240 generates from the incoming digital audio signals DA-IN an analog signal IN, which is supplied to a subscriber interface circuit 300, in the following also referred to as SLIC. Further, the POTS codec 240 receives an analog signal OUT generated by the SLIC 300 and generates the outgoing audio digital audio signal DA-OUT therefrom. The signals IN and OUT may for example be transferred as differential analog current or voltage signals.

The SLIC 300 accomplishes a conversion between the analog signals IN, OUT and the analog POTS signals, which are transferred through the POTS interface 200 on a two-line loop. Further functionalities of the SLIC 300 may for example include battery voltage generation for supplying a connected analog telephone apparatus, such as the telephone apparatus 10, ring voltage generation, and/or generation of signaling tones. Further, in the illustrated implementation the generation of the compensation signal for suppressing the hum signal may be realized in the SLIC 300.

In the illustrated implementation, the POTS module 200 further includes a controller 250, which implements control functionalities with respect to the POTS codec 240 and the SLIC 300. The control functionalities of the controller 250 may be externally managed through the control interface 230.

FIG. 3 illustrates exemplary structures for implementing the SLIC 300. In particular, FIG. 3 shows a circuit for implementing the SLIC 300 as a voltage feeding SLIC, in which the analog signals IN, OUT have the form of voltage signals.

In the illustrated implementation the SLIC 300 has a pair of buffers 310 which generate a loop current IL, which flows through the POTS interface 210 and a two-line loop 320 including an impedance ZT 15 associated with the connected telephone apparatus. The above-mentioned hum signal is superposed onto this loop current IL, which in FIG. 3 is schematically illustrated by an AC signal source 20. The buffer 310 generates the loop current IL depending on an input signal which is derived from the signal IN.

Further, the circuit of FIG. 3 provides detection resistors (RS) 330 in the loop 320 transferring the POTS signals. By means of the detection resistors 330, the loop current IL can be measured. This measurement is implemented by a sensor 340. From an output signal of the sensor 340, which in the illustrated implementation has the form of a voltage signal, the signal OUT is derived.

As illustrated, the circuit of FIG. 3 provides a compensation logic (CL) 350 which receives an input signal derived from the output signal of the sensor 340 and generates a compensation signal CMP. In particular, the compensation logic 350 is configured in such a way that it detects the hum signal in its input signal and generates the compensation signal CMP as signal which is opposite in phase with the hum signal. The compensation signal CMP is supplied to a summation node 360, which adds the compensation signal to a signal derived from the signal IN, from which in turn the input signal of the buffers 310 is derived. In this way, the compensation signal CMP is combined with the POTS signal in the loop 320, so that the contribution of the hum signal in the POTS signal is reduced.

In the illustrated implementation, the circuit includes further components which have the purpose of signal conditioning and signal separation of the incoming signals IN and the outgoing signal OUT. In particular, an impedance matching filter (IM Filter) 372 is provided, which supplies a signal derived from the output signal of the sensor 340 to a summation node 374, to accomplish matching to an impedance typical for the country. Further, a transmission hybrid (TH) 376 may be provided, which supplies a signal derived from the signal IN to a summation node 378, to accomplish suppression of corresponding signal contributions in the signal OUT. Thus, a separation of the incoming signal IN and the outgoing signal OUT may be accomplished by the transmission hybrid and the summation node 378. The implementation of the impedance matching filter 372 and the transmission hybrid 376 may be according to conventional technologies as known to the skilled person.

Further, the implementation illustrated in FIG. 3 provides filters 380, 390, by means of which undesired disturbing signals may be suppressed. For example, the filters 380 may be implemented as low-pass filters, and the filters 390 may be implemented as high-pass filters, so that in combination a frequency window as desired for the transmission of voice signals is obtained.

FIG. 4 further illustrates an exemplary implementation of the compensation logic.

As illustrated, the compensation logic includes a filter 351 which selectively filters the fundamental wave GW of the hum signal from the input signal of the compensation logic 350. The filter 351 may for example be a narrow band band-pass filter with a pass band at a frequency of the utilized line voltage VAC. The output signal of the filter 351, which substantially corresponds to the fundamental wave of the GW of the hum signal, is supplied to an inverting amplifier 352, which generates therefrom a signal which is opposite in phase with the fundamental wave GW.

Further, in the illustrated implementation the compensation logic 350 includes a further filter 353, which selectively filters a first harmonic wave OW1 from the input signal of the compensation logic 350. The filter 353 may for example be realized as a narrow band band-pass filter with a pass band in the range of twice the frequency of the utilized line voltage VAC. The output signal of the filter 353, which substantially corresponds to the first harmonic wave OW1 of the hum signal, is supplied to a further inverting amplifier 354, which generates therefrom a signal which is opposite in phase with the first harmonic wave OW1.

Further, in the illustrated implementation the compensation logic 350 includes a still further filter 355, which selectively filters a second harmonic wave OW2 of the hum signal from the input signal of the compensation logic 350. The filter 355 may for example be realized as a narrow band band-pass filter with a pass band in the range of triple the frequency of the utilized line voltage VAC. The output signal of the filter 355, which substantially corresponds to the second harmonic wave OW2 of the hum signal, is supplied to a further inverting amplifier 356, which generates therefrom a signal which is opposite in phase with the second harmonic wave OW2.

The output signals of the inverting amplifiers 352, 354, 356 are supplied to a summation node 357, which adds the output signals of the inverting amplifiers 352, 354, 356 and thus generates the compensation signal CMP as a sum of signal components which correspond to the signal opposite in phase with the fundamental wave GW of the hum signal, a signal opposite in phase with the first harmonic wave OW1 of the hum signal, and a signal opposite in phase with the second harmonic wave OW2 of the hum signal.

As further illustrated, the compensation logic 350 may further be provided with an adaptation logic (AL) 358, which adapts amplification coefficients of the inverting amplifiers 352, 354, 356, to thereby adapt the amplitudes of the different signal components in the compensation signal CMP. This may be accomplished depending on the signal components of the hum signal as filtered by the filters 351, 353, 355, which correspond to the fundamental wave GW, the first harmonic wave OW1, and the second harmonic wave OW2. In particular, the amplification coefficient of the inverting amplifier 352 may be adapted depending on an amplitude of the fundamental wave GW of the hum signal. Further, the amplification coefficient of the inverting amplifier 354 may be adapted depending on an amplitude of the first harmonic wave OW1 of the hum signal. Further, the amplification coefficient of the inverting amplifier 356 may be adapted depending on an amplitude of the second harmonic wave OW2 of the hum signal. As a result, the amplitude of a signal component of the compensation signal CMP which is opposite in phase with the fundamental wave GW may be adapted depending on the amplitude of the fundamental wave GW of the hum signal, an amplitude of a signal component of the compensation signal CMP which is opposite in phase with the first harmonic wave OW1 of the hum signal may be adapted depending on the amplitude of the first harmonic wave OW1, and an amplitude of a signal component of the compensation signal CMP which is opposite in phase with the second harmonic wave OW2 of the hum signal, may be adapted depending on the amplitude of the second harmonic wave OW2. Therefore, a suppression of the hum signal which is as ideal as possible may be obtained not only for the fundamental wave, but also for the harmonic waves. For this purpose, the adaptation logic 358 may implement a control mechanism which aims at minimizing the detected amplitudes in the hum signal.

FIG. 5 shows a flow chart which illustrates an exemplary method for implementing the above-mentioned functionalities. In particular, the method may be implemented by a compensation circuit, which by way of example includes the compensation logic 350 illustrated in FIGS. 3 and 4 and the summation node 360.

At step 510, a hum signal is detected in an analog telephony signal. The telephony signal may in particular be a POTS signal. The hum signal may in particular be a mains hum introduced by a power supply. For detecting the hum signal, for example frequency selective filters may be utilized, such as the filters 351, 353, 355 illustrated in FIG. 4.

The analog telephony signal may be generated from incoming digital audio signals. Further, outgoing digital audio signals may be generated from the analog telephony signal. Examples for corresponding functionalities have been explained above in connection with the POTS codec 240 illustrated in FIG. 2.

At step 520, a compensation signal is generated which is opposite in phase with the hum signal. For this purpose, for example one or more inverting amplifiers may be utilized, such as for the inverting amplifiers 352, 354, 356 illustrated in FIG. 4. In some implementations, the compensation signal may be generated with a signal component opposite in phase with the fundamental wave and one or more further signal components which are respectively opposite in phase with a harmonic wave of the hum signal.

Further, also an amplitude of the hum signal may be detected when generating the hum signal, and an amplitude of the compensation signal may be adapted depending on the detected amplitude. If in addition to the fundamental wave of the hum signal also one or more harmonic waves of the hum signal are detected, a corresponding amplitude may be detected for the fundamental wave and each of these harmonic waves, and in the compensation signal an amplitude of the corresponding signal component opposite in phase may be adapted depending on this detected amplitude. An exemplary implementation, which allows for taking into account the fundamental wave, the first harmonic wave and the second harmonic wave of the hum signal, is illustrated in FIG. 4.

At step 530, the compensation signal is combined with the analog telephony signal. This can for example be accomplished by means of a summation node, such as the summation node 360 illustrated in FIG. 3.

It is to be understood that various modifications are possible in the illustrated embodiments and implementations, without deviating from the fundamental ideas of the illustrated concepts. For example, alternative circuit structures could be utilized for realizing the compensation logic, e.g., digital signal processing elements. Further, the concepts could be applied without consideration of harmonic waves of the hum signal or with consideration of a different number of harmonic waves. Further, the illustrated concepts may be applied in various device types. Furthermore, the concepts are not limited to application in connection with a voltage feeding SLIC, as for example is illustrated in FIG. 3. Rather, the concepts could also be applied in a corresponding manner to a current feeding SLIC, in which case the compensation signal could be generated and supplied as a current.

The invention claimed is:

1. A network termination device in which a hum signal is generated from power mains, the network termination device comprising:
    a Plain Old Telephony System, POTS, interface configured to transfer an analog telephony signal,
    a digital broadband interface for transferring digital audio signals with a digital communication network;
    a signal processing circuit configured to accomplish signal conversion between the analog telephony signal and the digital audio signals; and
    a compensation circuit configured to detect the hum signal in the analog telephony signal, to generate a compensation signal which is opposite in phase with the hum signal, and to combine the compensation signal with the analog telephony signal.

2. The network termination device according to claim 1, wherein the compensation circuit is configured to detect an amplitude of the hum signal and to adapt an amplitude of the compensation signal depending on the detected amplitude.

3. The network termination device according to claim 1, wherein the compensation circuit is configured to detect a fundamental wave of the hum signal and one or more harmonic waves of the hum signal and to generate the compensation signal with signal components which are opposite in phase with the fundamental wave and the at least one harmonic wave.

4. The network termination device according to claim 3, wherein the compensation circuit is configured to detect in the hum signal an amplitude of the fundamental wave and respectively an amplitude of the at least one harmonic wave.

5. The network termination device according to claim 3, wherein the compensation circuit is configured to adapt in the compensation signal an amplitude of the signal component opposite in phase with the fundamental wave and respectively an amplitude of the signal component in opposite phase with the at least one harmonic wave.

6. The network termination device according to claim 1, wherein the hum signal is a mains hum introduced by a power supply of the network termination device.

7. A method, comprising:
in a network termination device in which a hum signal is generated from power mains:
detecting the hum signal in an analog telephony signal;
generating a compensation signal which is opposite in phase with the hum signal;
combining the compensation signal with the analog telephony signal,
generating the analog telephony signal from incoming digital audio signals;
generating outgoing digital audio signals from the analog telephony signals; and
transferring the incoming digital audio signals and the outgoing digital audio signals via a digital broadband interface of the network termination device with a digital communication network.

8. The method according to claim 7, comprising:
detecting an amplitude of the hum signal; and
depending on the detected amplitude, adapting an amplitude of the compensation signal.

9. The method according to claim 7, comprising:
detecting a fundamental wave of the hum signal and one or more harmonic waves of the hum signal; and
generating the compensation signal with signal components which are opposite in phase with the fundamental wave and the at least one harmonic wave.

10. The method according to claim 9, comprising:
detecting, in the hum signal, an amplitude of the fundamental wave and respectively an amplitude of the at least one harmonic wave.

11. The method according to claim 9, comprising:
adapting, in the compensation signal, an amplitude of the signal component opposite in phase with the fundamental wave and respectively an amplitude of the signal component in opposite phase with the at least one harmonic wave.

12. The method according to claim 7,
wherein the hum signal is a mains hum introduced by a power supply of the network termination device.

* * * * *